United States Patent
Oh

(10) Patent No.: US 9,574,617 B2
(45) Date of Patent: Feb. 21, 2017

(54) CONSTANT VELOCITY JOINT BOOT ASSEMBLY

(71) Applicant: Dana Automotive Systems Group, LLC, Maumee, OH (US)

(72) Inventor: Seung Tark Oh, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 14/703,187

(22) Filed: May 4, 2015

(65) Prior Publication Data

US 2016/0025151 A1    Jan. 28, 2016

Related U.S. Application Data

(60) Provisional application No. 62/028,847, filed on Jul. 25, 2014.

(51) Int. Cl.
*F16D 3/84* (2006.01)

(52) U.S. Cl.
CPC ..................... *F16D 3/845* (2013.01)

(58) Field of Classification Search
CPC ........ F16D 3/845; F16D 2003/846; F16J 3/05; F16J 15/52; F16J 15/525; Y10T 403/31; Y10T 403/315
USPC ..... 464/173, 904–906; 403/50, 51; 277/634, 277/635; 74/18
See application file for complete search history.

(56) References Cited

U.S. PATENT DOCUMENTS

| | | | |
|---|---|---|---|
| 5,230,660 A | 7/1993 | Warnke | |
| 6,264,568 B1 | 7/2001 | Frazer et al. | |
| 6,293,873 B1 | 9/2001 | Iwano et al. | |
| 6,579,187 B2 * | 6/2003 | Ramey | F16D 3/845 |
| | | | 403/23 |
| 7,094,155 B2 | 8/2006 | Hosoya et al. | |
| 7,229,356 B2 | 6/2007 | Iwano | |
| 7,282,166 B2 | 10/2007 | Wang | |
| 7,347,785 B2 * | 3/2008 | Worman, Jr. | F16D 1/068 |
| | | | 464/143 |
| 8,262,489 B2 | 9/2012 | Valovick | |
| 8,771,092 B2 | 7/2014 | Fujio | |
| 2012/0004044 A1 | 1/2012 | Conger | |
| 2013/0102397 A1 | 4/2013 | Ooba | |
| 2013/0252748 A1 | 9/2013 | Sugiyama | |

FOREIGN PATENT DOCUMENTS

| | | | |
|---|---|---|---|
| DE | 29823919 U1 * | 1/2000 | F16D 3/223 |
| DE | 19831015 | 3/2000 | |
| JP | 2008275133 | 11/2008 | |
| WO | WO 2007086172 A1 * | 8/2007 | F16D 3/84 |

* cited by examiner

*Primary Examiner* — Josh Skroupa
(74) *Attorney, Agent, or Firm* — Marshall & Melhorn, LLC

(57) ABSTRACT

A constant velocity joint boot assembly has a boot can connected to an outer race of the joint. The boot can receives a portion of a boot. The thickness of the boot may be changed in different areas to result in different boot performances. A sleeve is connected to the inner race. A portion of the sleeve may have a complementary shape to a portion of the boot, also to result in different boot performance. A clamp may be located over a portion of the boot to secure it to the sleeve.

12 Claims, 9 Drawing Sheets

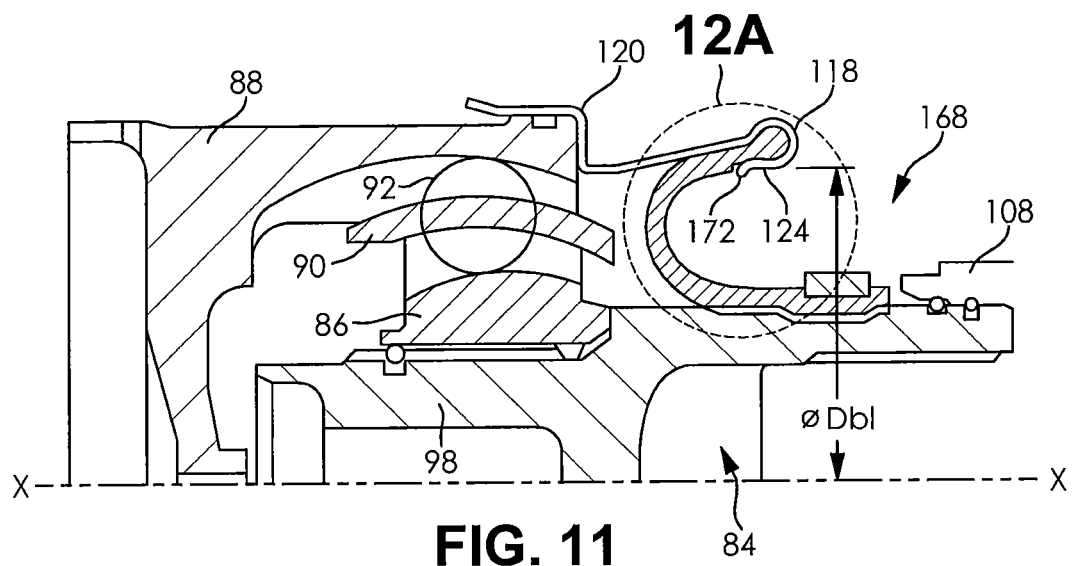
FIG. 11
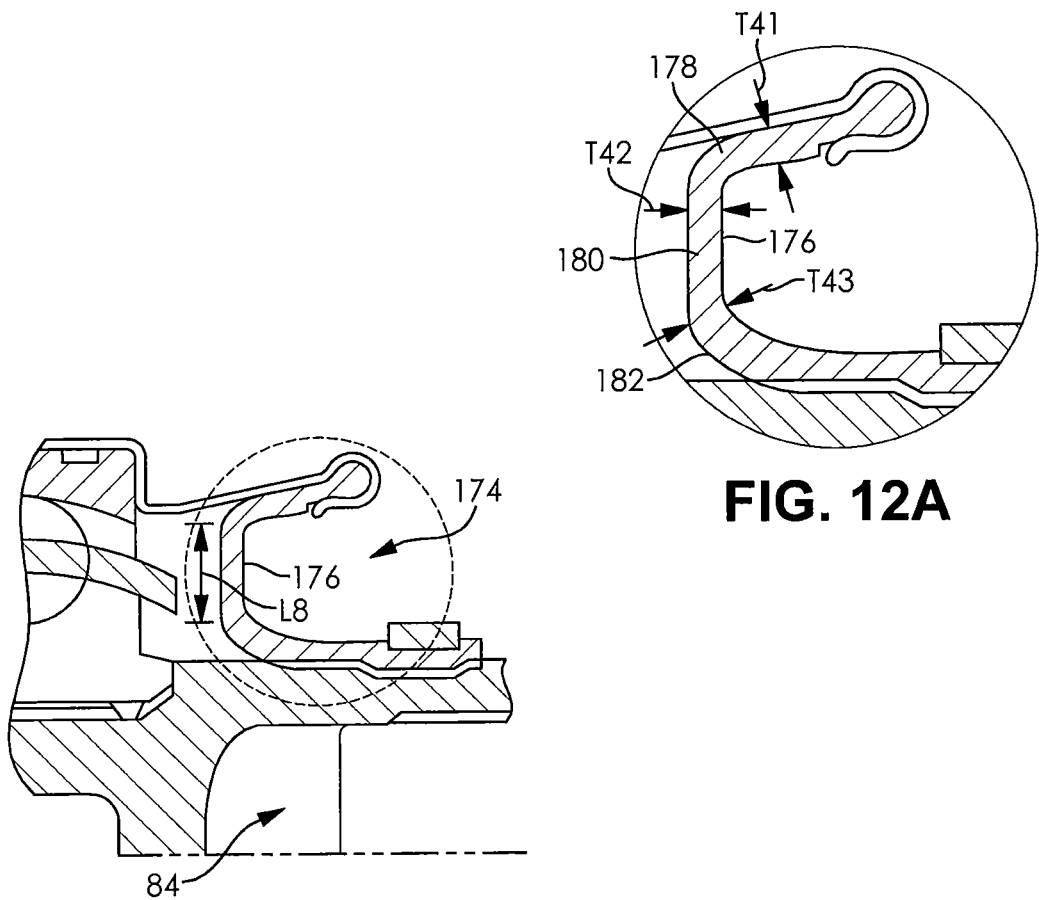
FIG. 12A
FIG. 12

CONSTANT VELOCITY JOINT BOOT ASSEMBLY

RELATED APPLICATIONS

This application claims priority to and the benefit of U.S. Provisional Application Ser. No. 62/028,847 filed on Jul. 25, 2014, which is incorporated by reference in its entirety.

FIELD

The device described herein relates to a boot assembly for a constant velocity joint.

BACKGROUND

Boots are well-known devices used to enclose an end of a constant velocity joint. Boots keep out dirt, debris and moisture from the joint and keep lubricant in the joint.

One example of a prior art boot 10 for a joint 12 is depicted in FIG. 1. The joint 12 comprises an inner race 14, an outer race 16, a cage 18 and at least one ball 20 within the cage 18.

The boot 10 encloses one end of the joint 12. The boot 10 is connected at one end to the outer race 16 with a boot can 22. A boot bead 26 is formed on the boot can 22 to capture the boot 10. The boot bead 26 is generally round and formed inwardly. A boot can crimp 28 also helps hold the boot 10 in place. The boot can crimp 28 is also formed inwardly. The boot 10 is connected at the other end to a shaft 24, such as by a clamp 30.

The size of the boot 10 used in FIG. 1 is characterized by boot length L, boot can length LL, boot can inner diameter Ø Db and the thickness of the boot 10. Boot length L, boot can length LL and boot can inner diameter Ø Db are determined by the required maximum static articulation angle capability, which is depicted in FIG. 2. More particularly, boot length L is determined in a way that boot length L in a joint assembly state as shown in FIG. 1 is equivalent to the boot length of an extended boot region 32 and the boot length of a contracted boot region 34 at a maximum joint angle.

Boot thickness for the boot 10 of FIGS. 1 and 2 is depicted in FIG. 3. The boot 10 generally has a round shape RR with an angle α from the horizontal, where the thickness T1 of an upper slope portion 36, is equal to the thickness T2 of a concave portion 38, which is equal to the thickness T3 of a lower slope portion 40. The joint boot thickness T1, T2, T3 is determined by taking into consideration boot radial and axial stiffness related to potential high risk boot failure modes, such as boot inversion and boot folding, both of which mainly occur at high joint internal pressures. Line Ø Dg represents the typical grease fill level for such a joint 12.

FIGS. 4-8 depict another prior art constant velocity joint 42 with a boot 44. The joint 42 comprises an inner race 46, an outer race 48, a cage 50 and at least one ball 52 within the cage. This joint 42 uses a sleeve 54 that couples the inner race 46 with a pinion shaft 56. A nut 58 connects the sleeve 54 to the pinion shaft 56.

The sleeve 54 in such a direct pinion mount design has a larger diameter Ds1 than a tube shaft diameter Ds in a non-direct pinion mount design, such as shown in FIGS. 1-3. Therefore, the boot can inner diameter Db1 should increase by the difference between Ds1–Ds to have the equivalent maximum static joint angle capability to that of a non-direct pinion mount design, such as in FIGS. 1-3. This results in a higher grease pressure acting on the direct pinion mount boot 44 compared with the pressure on the boot 10 depicted in FIG. 1.

The boot length L1 is limited by the nut 58 as shown in FIG. 4, therefore, it is more difficult to make the boot length L1 equivalent to the non-direct pinion mount joint boot length L depicted in FIG. 1. This results in a boot can inner diameter Db1 being bigger to have the equivalent boot overall length required for achieving a maximum joint angle compared to the design in FIG. 1.

Further, the limited boot axle length L1 cannot provide a sufficient press fit contact portion 62 between the sleeve 54 and the boot 44, which causes region 64 near a boot groove seat 66 to be bumped up and tilted toward the boot groove seat 66 by a crimping force of a boot clamp 68 acting on the boot clamp seat inside corner 70, which can be appreciated from FIGS. 6 and 7.

FIG. 8 depicts a direct pinion mount joint 42 having uniform boot thickness (T21=T22=T23) that has folded/self-contacted at a boot contacted region 78 as a result of the wrong boot thickness for this design. The figure also depicts the boot 44 being severely bent at an edge of the boot can crimp 80 by high grease pressure while operating at a high temperature, a high operating speed and at a high operating angle.

In view of the disadvantages of attempting to apply a non-direct pinion mount boot system to a direct pinion mount boot system, a new design is required.

SUMMARY

A constant velocity joint boot assembly has a boot can, a boot, a sleeve and a clamp. One part of the boot can is connected to an outer race and the other part of the boot can is cantilevered from the outer race. The boot can may have a crimp head for receiving the boot. The boot may have different regions where the thickness of the region changes, such as decreases from one to the next. The sleeve has one portion connected to the inner race and another portion extending from the inner race. The portion extending from the inner race may have a complementary shape to the boot. The clamp is used to secure the boot to the sleeve.

BRIEF DESCRIPTION OF THE DRAWINGS

FIG. 11 is a partial side view cross section of a second embodiment of a constant velocity joint and boot system;

FIG. 12 is a partial side view cross section of a third embodiment of a constant velocity joint;

FIG. 12A is a partial side view cross section of a detail of the joint in FIG. 12;

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
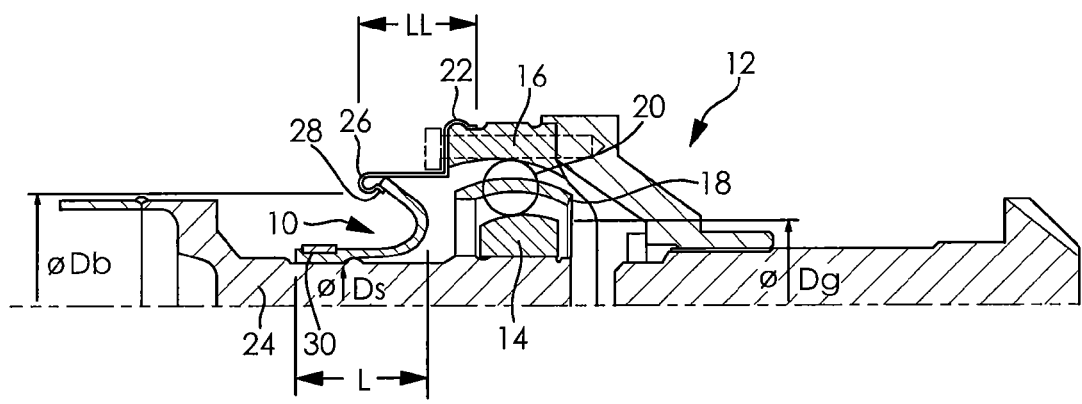
FIG. 1 is a partial side view cross section of a first prior art constant velocity joint.
Figure 2:
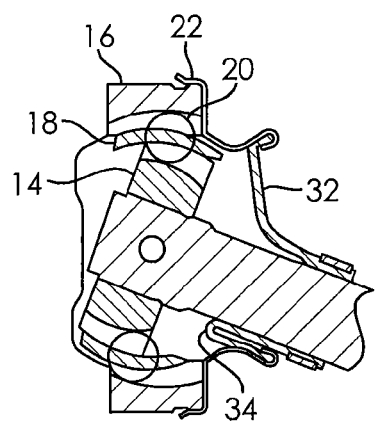
FIG. 2 is a partial side view cross section of a portion of the joint of FIG. 1 at a maximum articulation angle.
Figure 3:
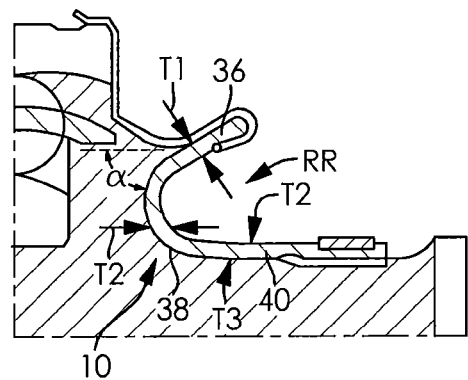
FIG. 3 is a partial side view cross section of a portion of the joint of FIG. 1.
Figure 4:
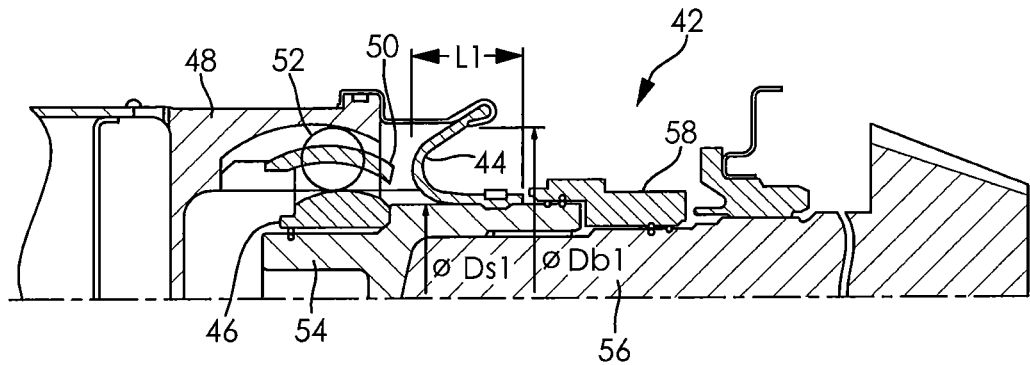
FIG. 4 is a second partial side view cross section of a prior art constant velocity joint.
Figure 6:
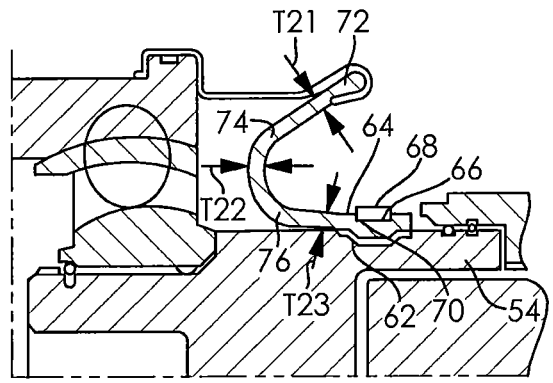
FIG. 6 is a partial side view cross section of a portion of the joint of FIG. 4.
Figure 5:
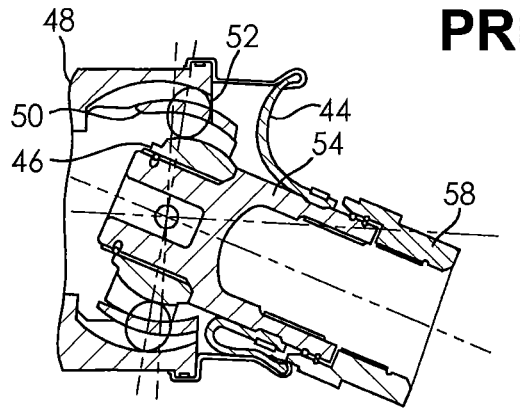
FIG. 5 is a partial side view cross section of a portion of the joint of FIG. 4 at a maximum articulation angle.
Figure 7:
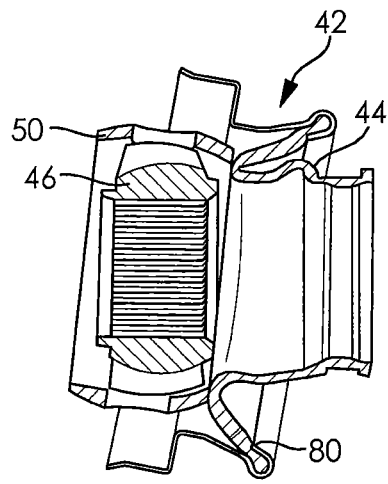
FIG. 7 is a partial side view cross section of a portion of the joint of FIG. 4.
Figure 8:
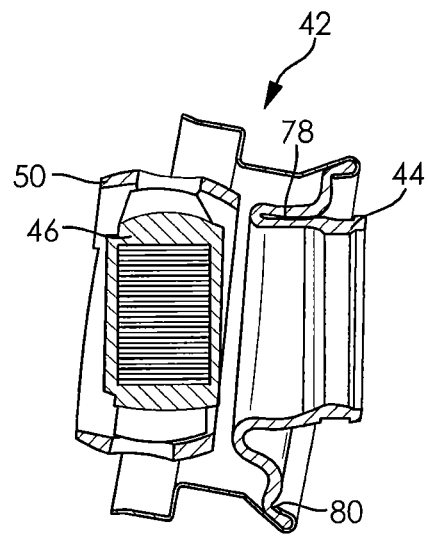
FIG. 8 is a partial side view cross section of a portion of the joint of FIG. 4.
Figure 9:
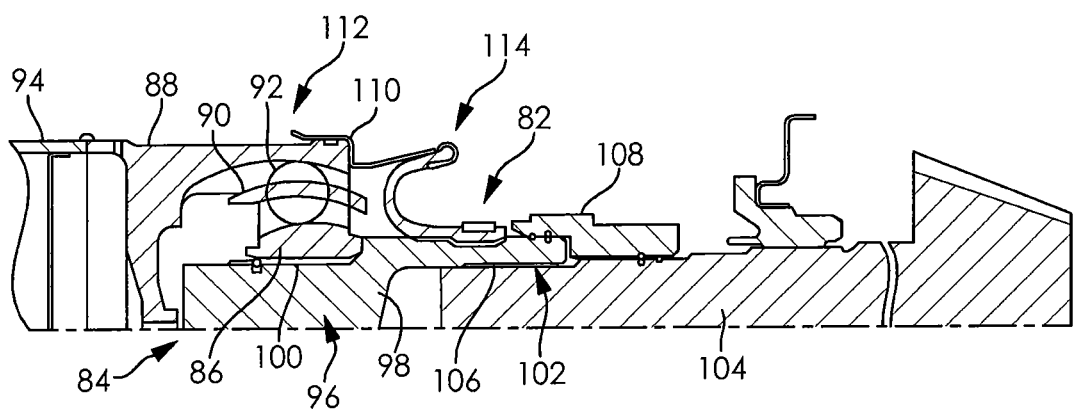
FIG. 9 is a partial side view cross section of a first embodiment of a constant velocity joint and boot system.

Turning to FIG. 9, one embodiment of a boot system 82 for a direct pinion mount joint 84 is depicted. The joint 84 comprises an inner race 86, an outer race 88, a cage 90 and at least one ball 92 within the cage 90. A tube 94 is connected, such as by welding, to the outer race 88. A first end 96 of a sleeve 98 is connected, such as by splines 100, to the inner diameter of the inner race 86. A second end 102 of the sleeve 98 receives a pinion shaft 104 therein, such as through a splined connection 106. A nut 108 connects the pinion shaft 104 to the sleeve 98.

Figure 10:
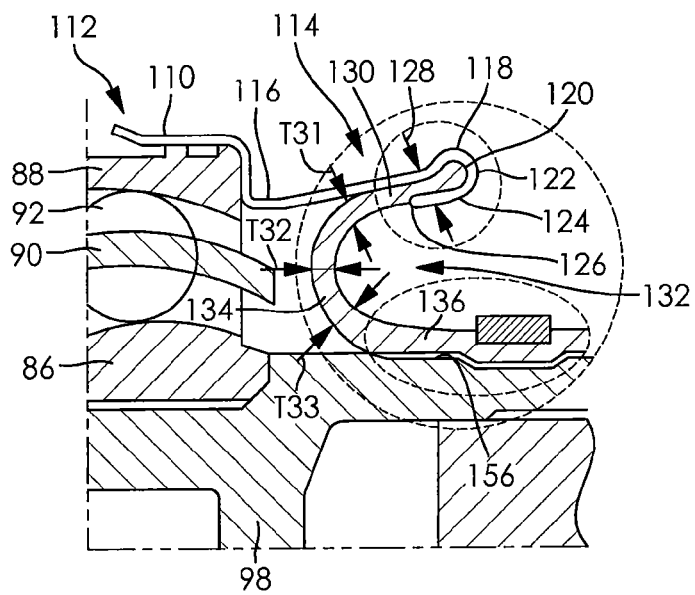
FIG. 10 is a partial side view cross section of a portion of the joint in FIG. 9.

A boot can 110 is depicted in FIGS. 9 and 10. The boot can 110 has a first end portion 112 connected to the outer race 88 and a second end portion 114 that is cantilevered over the joint 84. More particularly, the second end portion 114 is cantilevered over a portion of the sleeve 98.

Figure 10A:
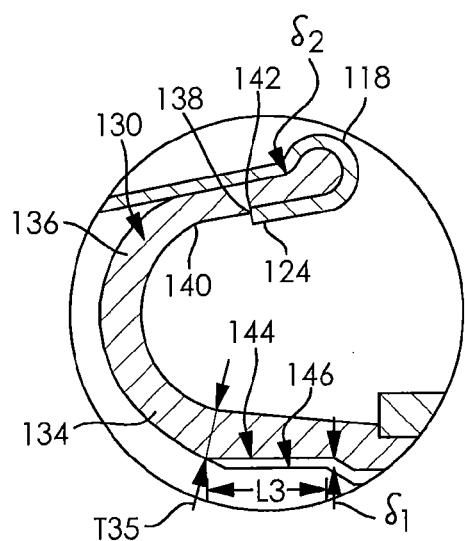
FIGS. 10A-10C are partial side view cross-sections of portions of the joint in FIG. 9.
Figure 10B:
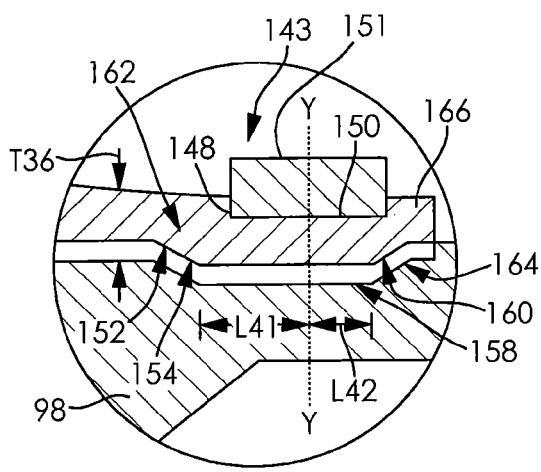
Figure 10C:
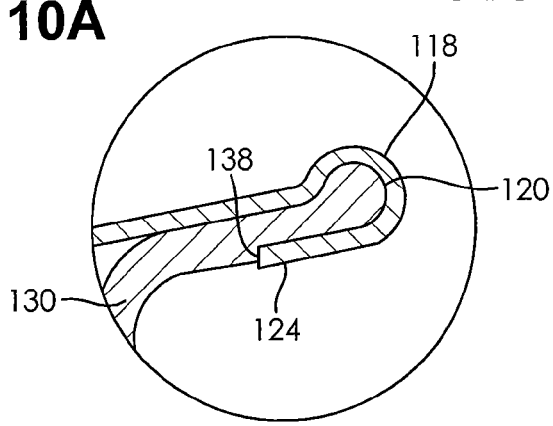

As best seen in FIGS. 10, 10A and 10C, the second end portion 114 comprises an outwardly angled, planar portion 116 and a boot can crimp head 118 at an end of the angled, planar portion 116. The boot can crimp head 118 first extends radially outward from the angled, planar portion 116 before it curves around on itself to create a semi-hemispherical hollow portion 120. A boot bead 121 is located in the portion 120. The boot bead 121 has an outward radially extending portion with a complementary shape to the portion 120.

One end 122 of a straight portion 124 of the can 110 connects with the semi-hemispherical hollow portion 120. The boot can 110 terminates at the other end 126 of the straight portion 124. The straight portion 124 is located radially inward from the angled, planar portion 116. A gap 128 separates the angled, planar portion from the straight portion 124.

With continued reference to FIG. 10, it can be seen that the boot thickness smoothly decreases from an upper slope region 130, through a concave region 132 down to a lower slope region 134. The range of thicknesses of the upper slope region may be generally designated as T31, the range of thicknesses of the concave region 132 may be designated T32 and the range of thicknesses of the lower slope region 134 may be generally designated as T33. The decrease in thickness is represented by T31>T32>T33. The decrease in thickness from the upper slope region 130 to the lower slope region 134 reduces boot radial deformation caused by high grease pressure anywhere in the boot 136, but is particularly effective at the upper slope region 130.

The boot 136 also includes a boot stopper 138 in the upper slope region 130, as shown in FIG. 10A. More particularly, the boot stopper 138 is located on an outside boot surface 140 that abuts, or is adjacent, the boot can straight portion 124. The boot stopper 138 comprises a radially inward step 142 into the boot 136 that reduces the thickness of the boot 136 at that location of the step 142. The boot stopper 138 prevents radial boot deformation via the direct contact with the boot can 110, particularly when the boot 136 is significantly deformed.

As can be appreciated by FIG. 10A, a press load δ2 is used to locate the upper slope region 130 into the boot can crimp head 118. The press load δ2 functions to minimize boot radial deformation.

Lower slope region 134 transitions to a boot clamping portion 143, as shown in FIG. 10B. The boot clamping portion 143 comprises three portions: L3 (as shown in FIG. 10A), L41, and L42. L3 comprises a planar portion 144 on an inside surface 146 of the boot 136. A press load δ1 is applied to L3 so that L3 is located in contact with the sleeve 98. The press load δ1 also minimizes the effect, if any, of an inside corner 148 of a boot seat groove 150 that can function like a hinge on the boot 136 to lift it away from the sleeve 98. A clamp 151 is located in the boot seat groove 150.

As seen in FIG. 10, the upper slope portion, the concave region and the lower slope region form a C-shape. As a result, the upper slope region is radially above the lower slope region and/or the boot clamping portion. Additionally, a portion of the boot clamping portion extends axially beyond the upper slope region. More particularly, the boot seat groove extends axially beyond the upper slope region.

A first angled transition 152 in the boot 136 separates L3 from L41 and L42. The first angled transition 152 has a complementary shape to a first angled transition 154 in an outer surface 156 of the sleeve 98. The first angled transition extends into the sleeve 98 at a radial angle. The first angled transition 154 in the sleeve 98 leads to a sleeve groove 158. The sleeve groove 158 is planar. A second angled transition 160 extends from the sleeve groove 158. The second angled transition 160 extends into the sleeve 98 at a radial angle.

L41 and L42 are coplanar surfaces with one another on the inside surface 146 of the boot 136. L41 is designed to be longer than L42; the two lengths being separated by line Y-Y which defines a centerline of the boot seat groove 150 and the clamp 151. It is preferred that L41 is longer than L42 to reduce or prevent region 162 from being lifted and tilted by the above-mentioned corner 148. Preferably, the thickness of the region 162 is gradually reduced from the general range of thicknesses in the region of T35 to the general range of thicknesses in the region of T36 along L3. The reduction in thickness also reduces or prevents the region 162 from being lifted and tilted by the corner 148. A second angled transition 164 in the boot 136, which is complementary to transition 160, connects L42 with a boot end portion 166.

L41 and L42 are parallel to the sleeve groove 158 and L41 and L42 are equal length compared with sleeve groove 158. And, upon application of a clamping force by the clamp 151, L41 and L42 come into contact with the sleeve groove 158. Similarly, the first and second angled transitions 152, 164 in the boot 136 come into contact with the first and second angled transitions 154, 160 in the sleeve 98 upon application of the clamping force.

Turning now to FIG. 11, a second embodiment of a boot system 168 for the direct pinion joint 84 is depicted. The components of the joint 84 and the components of the boot system 168 are the same as those depicted in the first embodiment, except as follows.

In FIG. 11, the straight portion 124 is oriented parallel to a joint center line X-X to improve manufacturability of the boot can 120 and the crimp head 168 in the can 120 by controlling the boot can inner diameter Db1.

Further, the straight portion 124 does not abruptly terminate as in the first embodiment. Instead, a radiused end portion 172 that extends radially inward from the boot 136 is used.

FIGS. 12 and 12A depict a third embodiment of a boot system 174 for the direct pinion mount joint 84. The components of the joint 84 and the components of the boot system 174 are the same as those depicted in the first embodiment, except as follows.

A boot 176 in FIGS. 12 and 12A has a semi-half rectangular cross section that has a thickness that gradually and smoothly decreases from an upper slope region 178 through a concave region 180 down to a lower slope region 182. Put another way, the thickness T41 of the upper slope region 178 is greater than the thickness T42 of the concave region 180, which is greater than the thickness T43 of the lower slope region 182. Additionally, the boot 176 has a straight portion L8 between the upper slope region 178 and the lower slope region 182. The straight portion L8 may be on one or both sides of the boot 176. While FIGS. 12 and 12A depict L8 as having one length, other lengths are permissible. The straight portion L8 is designed to maintain grease pressure in the joint 84. The straight portion may have a thickness T42 that is substantially constant in order to maintain the grease pressure.

FIGS. 13 and 14A-14C depict a fourth embodiment of a boot system 184 for the direct pinion mount joint 84. The components of the joint 84 and the components of the boot system 184 as those depicted in the first embodiment, except as follows:

In this embodiment, the boot can crimp head 118 depicted and described in the previous embodiments is removed from the boot can 186. The boot can 186 has the second end portion 114 with an angled, planar portion 116. The boot can angled, planar portion 116 terminates in a radiused, radially outward extending end 188.

The boot can angled, planar portion 116 extends for a length L7. An inner surface 190 of the boot 192 is directly bonded or vulcanized to an inner surface 194 of the boot can 186 along the boot can angled, planar portion 116 at least partially along L7.

Figure 13:
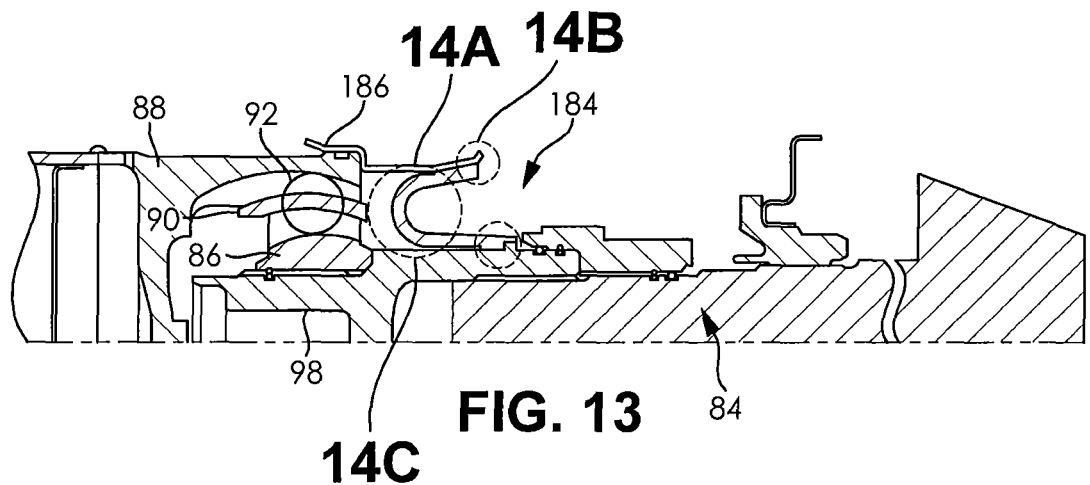
FIG. 13 is a partial side view cross section of a fourth embodiment of a constant velocity joint and boot system.
Figure 14A:
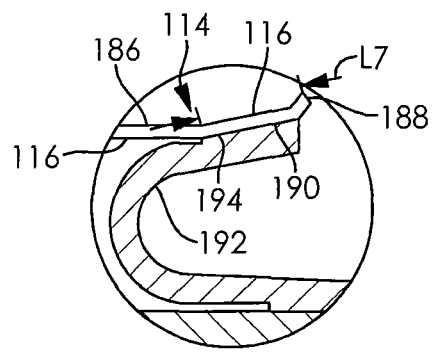
FIGS. 14A-14C comprises three partial side view cross sections of portions of the joint in FIG. 13.
Figure 14B:
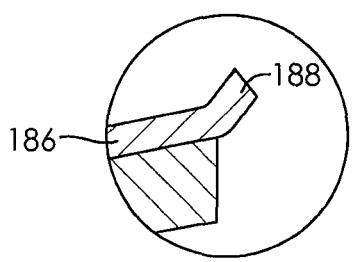
Figure 14C:
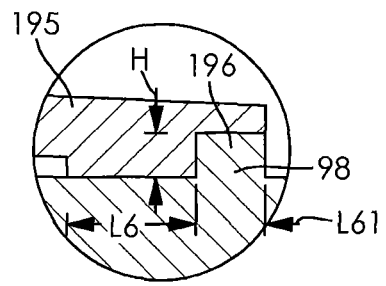

The boot can 186 and boot 192 attachment depicted in FIG. 14 provides additional space to increase joint angle capability compared with the first embodiment since the boot head crimp is removed. Additionally, the embodiment depicted in FIGS. 13 and 14A-14C helps simplify the manufacturing process since a boot can crimping step is not required.

With continued reference to FIGS. 14A-14C, a boot lower portion 195 may be directly bonded or vulcanized to the sleeve 98 along lengths L6 and L61. A step 196 may be provided between L6 and L61 so that a radial height difference H results. The bond or vulcanization of the boot lower portion 195 to the sleeve 98 prevents the boot 192 from being lifted and/or tilted by the inside corner 148, so that a boot clamp is not required. The step 196 provides increased surface area to connect the boot 192 and the sleeve 98. The step 196 also provides a stop against which the boot 192 rests to prevent its movement and lock it in place.

Except as described herein, the boot 192 has the same profile, parts and thicknesses for the upper slope region, the concave region and the lower slope region described in FIG. 10. This design reduces boot radial deformation, such as boot folding and self-contact, caused by high grease pressure.

Figure 15:
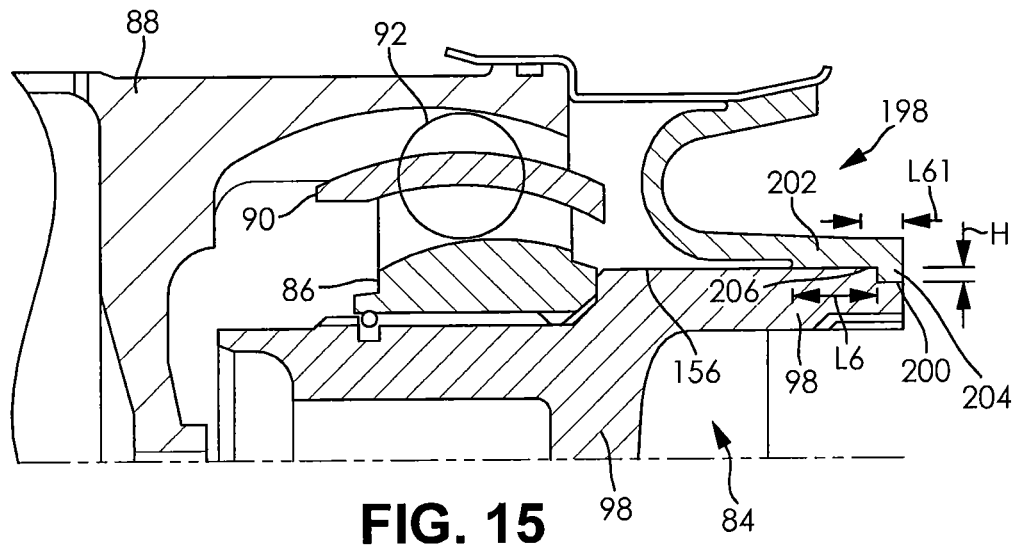
FIG. 15 is a partial side view cross section of a fifth embodiment of a constant velocity joint and boot system.

FIG. 15 depicts a sixth embodiment of a boot system 198 for the direct pinion mount joint 84. The components of the joint 84 and the components of the boot system 198 are the same as those depicted in the fourth embodiment, except as follows:

A groove 200 is located in the outer surface 156 of the sleeve 98. The groove 200 extends continuously circumferentially about the outer surface 156 of the sleeve 98 at the same sleeve axial location. In the depicted embodiment, the groove 200 has a rectangular cross-section, but other shapes are permissible. The groove 200 is located axially adjacent L6. The groove 200 has a length L61, which is less than L6. The groove 200 has a depth H, which preferably is the same height H as the step in FIG. 14.

A boot lower portion 202 terminates in a rib 204. The rib 204 preferably extends continuously circumferentially radially inward about an inside surface 206 of the boot lower portion 202. The rib 204 has a complementary shape to the groove 200 and also has height H. In this embodiment, the rib 204 has a rectangular cross-section, but others are permissible.

The groove 200 and rib 204 provide increased surface area to connect the boot 208 and the sleeve 98. The groove 200 and rib 204 also function as a stop to prevent movement of the boot 208 and lock it in place.

Figure 16:
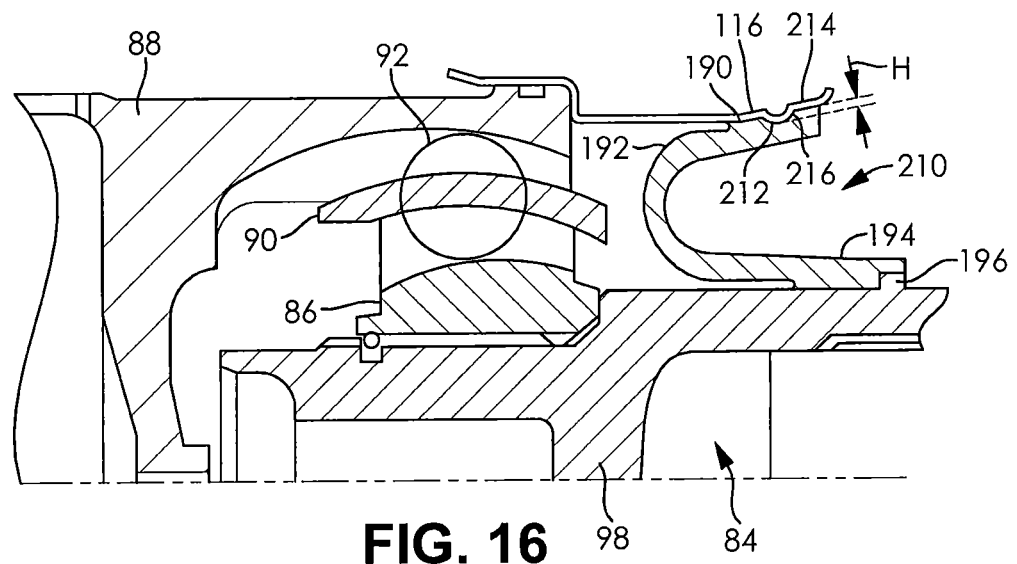
FIG. 16 is a partial side view cross section of a sixth embodiment of a constant velocity joint and boot system.

FIG. 16 depicts a seventh embodiment of a boot system 210 for the direct pinion mount joint 84. The components of the joint 84 and the components of the boot system 210 are the same as those depicted in the fourth embodiment, except as follows.

A groove 212 is located in the boot can angled, planar portion 116. Preferably, the groove 212 is located at a mid-point between the ends of the angled, planar portion 116 but it may be located at any point between the ends.

The groove 212 creates a concave surface in an upper surface 214 of the boot can 186 and a corresponding convex surface in a lower surface 216 of the boot can 186. The groove 212 preferably has the same depth as the radial height H depicted and described in FIG. 14 of the fourth embodiment.

As in the fourth embodiment, the inner surface 190 of the boot 192 is directly bonded or vulcanized to the boot can angled, planar portion 116 along the lower surface 216 of the boot can 110 to provide the same advantage. The boot lower portion 194 is similarly attached to the sleeve 54. The boot 192 has the same thickness as described above for the fourth embodiment.

The groove 212 provides increased surface area to connect the boot 192 and the boot can 186. The step 196 also provides a stop against which the boot 192 rests to prevent its movement and lock it in place.

Figure 17:
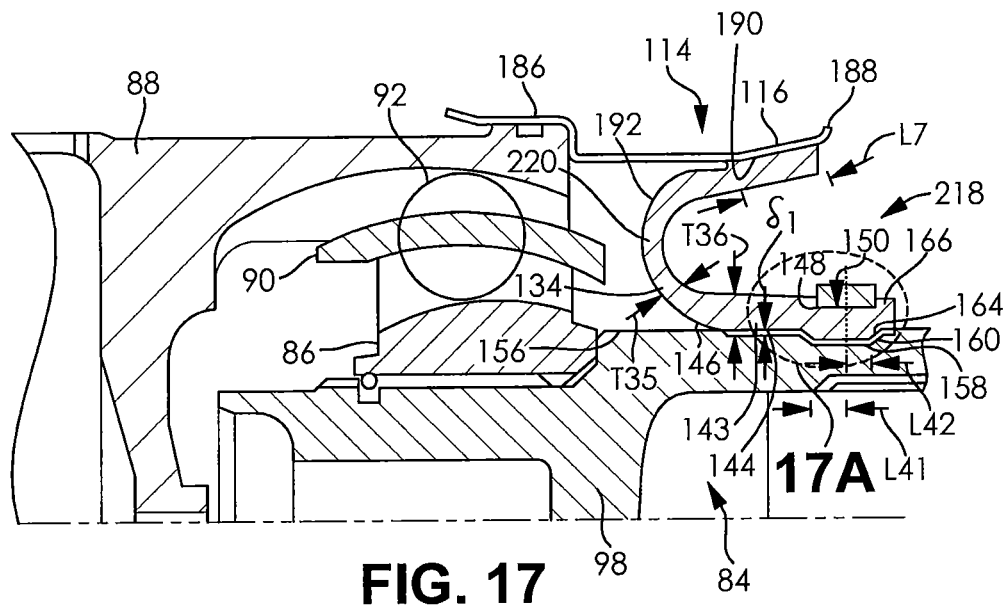
FIG. 17 is a partial side view cross section of a seventh embodiment of a constant velocity joint boot system.
Figure 17A:
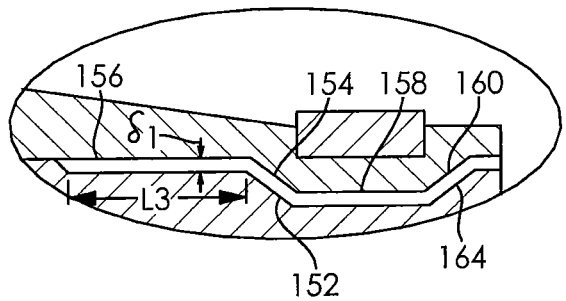
FIG. 17A is a partial side view cross section of a detail from FIG. 17.

FIGS. 17 and 17A depict a seventh embodiment of a boot system 218 utilizing the same components of the joint 84 with some of the boot system components from FIGS. 9-10 and FIG. 13.

The boot can 186 has the second end portion 114 with the angled, planar portion 116. The boot can angled, planar portion 116 terminates in the radiused, radially outward extending end 188, as shown in the embodiment depicted in FIG. 13.

The boot can angled, planar portion 116 extends for length L7. The inner surface 190 of the boot 192 is directly bonded or vulcanized to the boot can angled, planar portion 116 at least partially along L7.

The boot can 186 and the above-described method of attaching the boot 192 provides additional space to increase joint angle capability compared with the first embodiment since the boot head crimp is removed. Additionally, this design helps simplify the manufacturing process since a boot can crimping step is not required.

FIG. 17 shows a lower slope region 134 transitioning to the boot clamping portion 143 as described and depicted in FIG. 10. The boot clamping portion 143 comprises three portions: L3, L41, and L42. L3 is depicted in FIG. 17A. L3 comprises the planar portion 144 on the inside surface 146 of the boot 220. A press load δ1 is applied to L3 so that L3 is located in contact with the sleeve 98. The press load δ1 also minimizes the effect, if any, of the inside corner 148 of the boot seat groove 150 that functions like a hinge.

The first angled transition 152 separates L3 from L41 and L42. The first angled transition 152 has a complementary shape to the first angled transition 154 in the outer surface 156 of the sleeve 98. The first angled transition 154 in the sleeve 98 leads to a sleeve groove 158. A second angled transition 160 extends from the sleeve groove 158.

L41 and L42 are coplanar surfaces with one another on the inside surface 146 of the boot 220. L41 is designed to be longer than L42; the two lengths being divided by line Y-Y which defines a centerline of the sleeve groove 158. It is preferred that L41 is longer than L42 to help prevent region 146 from being lifted and tilted by the above-mentioned hinge. Preferably, the thickness of the region 146 is reduced from T35 to T36 along L3. This is designed to also prevent the region 146 from being lifted and tilted by the hinge. A second angled transition 164 connects with the boot end portion 166.

L41 and L42 are parallel to the sleeve groove 158. And, upon application of a clamping force, L41 and L42 come into contact with the sleeve groove 158. Similarly, the first and second angled transitions 152, 164 in the boot 220 come into contact with the first and second angled transitions 154, 160 in the sleeve 98 upon application of the clamping force.

Figure 18:
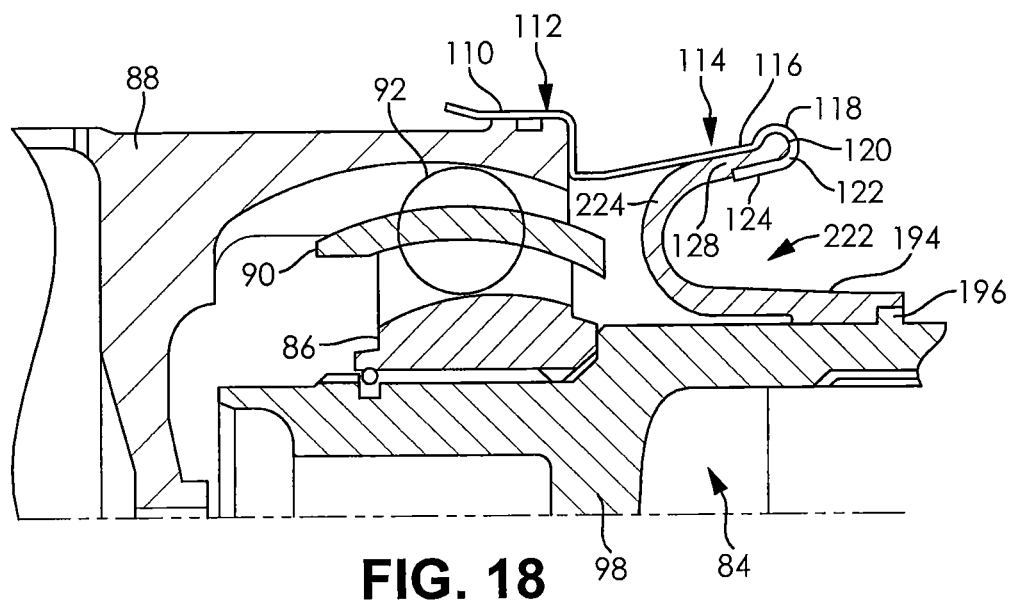
FIG. 18 is a partial side view cross section of an eighth embodiment of a constant velocity joint boot system.

FIG. 18 depicts an eighth embodiment of a boot system 222 utilizing the same components of the joint 84 with some of the boot system components from FIGS. 9-10 and FIG. 14.

As seen in FIG. 18, the boot can 110 has a first end portion 112 connected to the outer race 88 and a second end portion 114 that is cantilevered over the joint 84. More particularly, the second end portion 114 is cantilevered over a portion of the sleeve 98.

The second end portion 114 comprises the angled, planar portion 116 and the boot can crimp head 118 at the end of the angled, planar portion 116. The boot can crimp head 118 first extends radially outward from the angled, planar portion 116 before it curves around on itself to create the semi-hemispherical hollow portion 120. One end 122 of the straight portion 124 of the can 110 connects with the semi-hemispherical hollow portion 120. The boot can 110 terminates at the other end of the straight portion 124. The straight portion 124 is located radially inward from the angled, planar portion 116. The gap 128 separates the angled planar portion 116 from the straight portion 124.

The boot lower portion 194 is attached to the sleeve 98 such as via a direct bond or vulcanization. The step 196 provides increased surface area to connect the boot 224 and the sleeve 98 and it provides a stop against which the boot 224 rests to prevent its movement and lock it in place.

Figure 19:
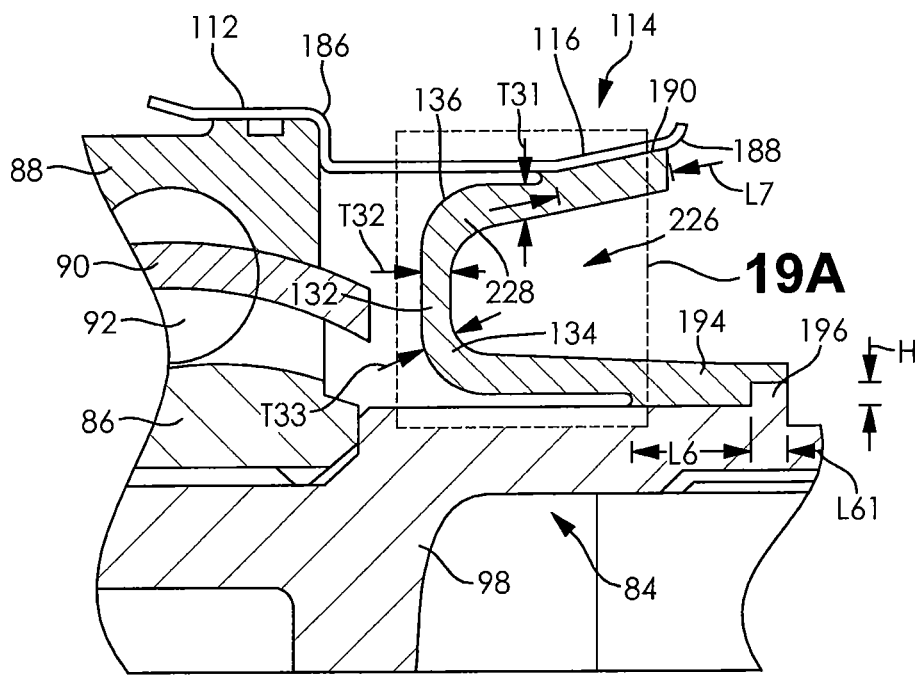
FIG. 19 is a partial side view cross section of a ninth embodiment of a constant velocity joint boot system.
Figure 19A:
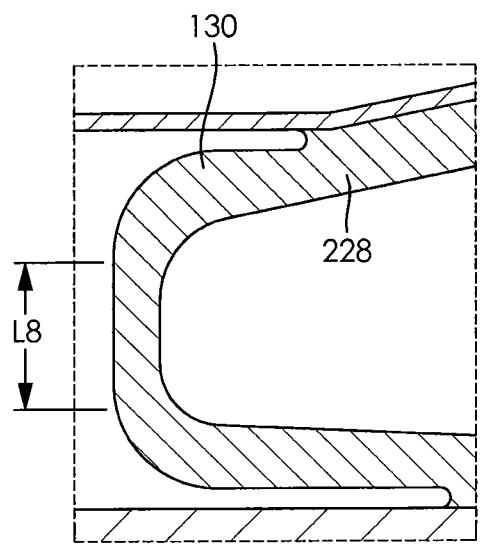
FIG. 19A is a partial side view cross section of a detail from FIG. 19.

FIGS. 19 and 19A depicts a ninth embodiment of a boot system 226 utilizing the same components of the joint 84 with some of the boot system components from FIGS. 12 and 13.

The boot can 186 has the second end portion 114 with an angled, planar portion 116. The boot can angled, planar portion 116 terminates in a radiused, radially outward extending end 188.

The boot can angled, planar portion 116 extends for a length L7. The inner surface 190 of the boot 228 is directly bonded or vulcanized to the boot can angled, planar portion 116 at least partially along L7.

The boot 228 as depicted in FIGS. 19 and 19A has a semi-half rectangular cross section that has a thickness that gradually and smoothly decreases from the upper slope region 130 through the concave region 132 down the lower slope region 134. Put another way, the thickness T31 of the upper slope region 130 is greater than the thickness T32 of the concave region 132, which is greater than the thickness T33 of the lower slope region 134. Additionally, the boot has the straight portion L8 between the upper slope region 130 and the lower slope region 134. The straight portion L8 is designed to maintain grease pressure in the joint 84. Grease pressure is maintained since the boot thickness 229 along L8 is substantially constant.

With continued reference to FIG. 19, the boot lower portion 194 may be directly bonded or vulcanized to the sleeve 98 along lengths L6 and L61. The step 196 may be provided between L6 and L61 so that a radial height difference H results. The bond or vulcanization of the boot lower portion 194 to the sleeve 98 prevents the boot 228 from being lifted and/or tilted by the inside corner 148, so that no boot clamp is required. The step 196 provides increased surface area to connect the boot 228 and the sleeve 98. The step 198 also provides a stop against which the boot rests to prevent its movement and lock it in place.

In addition to the various embodiments described above, other embodiments are also permissible wherein any of the boot system components described above may be combined with one another.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:
1. A constant velocity joint boot assembly, comprising:
a boot can having a first end portion connected to an outer race and a second end portion cantilevered from said outer race, said second end portion having an angled planar portion extending from said first end portion and a crimp head wherein said crimp head curls under said planar portion to define a hollow portion;

a boot having an upper slope region, a concave region and a boot clamp region, each of said regions having a range of thicknesses wherein said range of thicknesses constantly decreases from said upper slope region, through said concave region to said boot clamp region, wherein said boot clamp region is defined by a first inside surface planar portion, an inside surface first angled transition, a second inside surface planar portion, a third inside surface planar portion co-planar with said second inside surfaced planar portion, an inside surface second angled transition and an end portion;

a sleeve having one end portion connected to an inner surface of an inner race with complementary splines and a second end portion extending axially away from said inner race, said second end portion having a first planar portion complementary to said boot first inside surface planar portion, a first angled transition portion complementary to said boot inside surface first angled transition, a second planar portion complementary to said second and third boot inside surface planar portions, and a second angled transition portion complementary to said boot inside surface second angled transition; and a clamp located over said boot clamping region wherein a centerline of said clamp unequally divides said sleeve second and a third planar portion.

2. The assembly of claim 1, wherein said crimp head is comprised of a radially extending portion, said hollow portion, which is semi-hemispherical, a straight portion radially inward from the angled planar portion and a gap separating the angled, planar portion from the straight portion.

3. The assembly of claim 1, wherein said boot comprises a boot stopper in said upper slope region, said boot stopper located in an outside boot surface that is adjacent said boot can straight portion, said boot stopper having a radially inward step that reduces the thickness of the boot.

4. The assembly of claim 1, wherein said sleeve first angled transition separates said sleeve first planar portion and said sleeve second planar portion and sleeve second angled transition separates said second planar portion and third planar portion with a boot end portion.

5. The assembly of claim 4, wherein said sleeve second planar portion and said sleeve third planar portion are not coplanar with said sleeve first planar portion.

6. The assembly of claim 4, wherein said sleeve second planar portion and said sleeve third planar portion are not coplanar with said boot end portion.

7. The assembly of claim 1, wherein said sleeve second end portion receives a pinion shaft therein.

8. The assembly of claim 7, wherein a nut connects said pinion shaft with said sleeve.

9. The assembly of claim 1, wherein a portion of said boot clamp region extends axially beyond said upper slope region.

10. The assembly of claim 1, wherein said upper slope region is radially above said boot clamp region.

11. The assembly of claim 1, wherein said first inside surface planar portion of the boot is non-coplanar with said second and third inside surface planar portions of the boot.

12. The assembly of claim 1, wherein said first planar portion of said sleeve is non-coplanar with said second planar portion of said sleeve.

* * * * *